United States Patent
Feng et al.

(10) Patent No.: US 12,002,352 B2
(45) Date of Patent: Jun. 4, 2024

(54) MAPPING METHOD FOR RIGHT-TURN CONFLICT WARNING LINES AT URBAN ROAD INTERSECTIONS

(71) Applicants: Hefei University of Technology, Hefei (CN); Hefei Urban Planning and Design Institute, Hefei (CN); Intelligent Manufacturing Institute of HFUT, Hefei (CN)

(72) Inventors: Zhongxiang Feng, Hefei (CN); Yubing Zheng, Hefei (CN); Congjun Huang, Hefei (CN); Xu Jiang, Hefei (CN); Shisheng Fang, Hefei (CN); Zongzu Liu, Hefei (CN); Yinbin Shen, Hefei (CN); Hui Sun, Hefei (CN); Junxia Wang, Hefei (CN); Weihua Zhang, Hefei (CN); Kang Jiang, Hefei (CN)

(73) Assignees: HEFEI UNIVERSITY OF TECHNOLOGY; HEFEI URBAN PLANNING AND DESIGN INSTITUTE; INTELLIGENT MANUFACTURINIG INSTITUTE OF HFUT

(*) Notice: Subject to any disclaimer, the term of this patent is extended or adjusted under 35 U.S.C. 154(b) by 0 days.

(21) Appl. No.: 18/214,532

(22) Filed: Jun. 27, 2023

(65) Prior Publication Data
US 2024/0005781 A1    Jan. 4, 2024

(30) Foreign Application Priority Data
Jun. 29, 2022  (CN) .......................... 202210748742.7

(51) Int. Cl.
G08G 1/01 (2006.01)
G08G 1/16 (2006.01)

(52) U.S. Cl.
CPC ........... *G08G 1/0125* (2013.01); *G08G 1/167* (2013.01)

(58) Field of Classification Search
CPC ......... G08G 1/01; G08G 1/0125; G08G 1/167
(Continued)

(56) References Cited

U.S. PATENT DOCUMENTS

| 10,059,334 B1 * | 8/2018 | Zhu .................. B60W 50/0097 |
| 11,433,885 B1 * | 9/2022 | Beller ................. B60W 30/095 |

(Continued)

FOREIGN PATENT DOCUMENTS

| CA | 2721892 A1 * | 5/2011 | .......... H04M 1/6075 |
| CN | 201670165 U | 12/2010 | |

(Continued)

OTHER PUBLICATIONS

Huang Xiang-Yue, et al., Traffic Organization Design of Changing Peripheral Section of Dayan Pagoda into Double Section Based on Simulation Evaluation, Journal of Guangzhou Navigation Institute, 2019, pp. 7-12, vol. 27 Issue 1.

(Continued)

*Primary Examiner* — Atul Trivedi

(57) ABSTRACT

A mapping method for right-turn conflict warning lines at urban road intersections includes: obtaining the conflict data of urban intersections and the driving trajectory information of large vehicles and obtaining the outermost rear wheel trajectory curve and the innermost rear wheel trajectory curve through the driving trajectory information of large vehicles; using the regression model to construct the dynamic model of the right-turn conflict area of large vehicles and obtain the relationship between the parameters of the outermost rear wheel trajectory curve and the innermost rear wheel trajectory curve and the dynamic and static indexes; inputting the dynamic and static indexes of other (Continued)

road intersections into the dynamic model of the right-turn conflict area of large vehicles to obtain the corresponding outermost rear wheel trajectory curve and the innermost rear wheel trajectory curve, and drawing the urban road warning line.

3 Claims, 2 Drawing Sheets

(58) Field of Classification Search
USPC .......................................................... 701/117
See application file for complete search history.

(56) References Cited

U.S. PATENT DOCUMENTS

| | | | |
|---|---|---|---|
| 2015/0143913 A1* | 5/2015 | Adams | G06V 20/52 382/104 |
| 2018/0086284 A1* | 3/2018 | Gupta | H04N 17/002 |
| 2019/0384303 A1* | 12/2019 | Muller | G06N 20/00 |
| 2020/0117916 A1* | 4/2020 | Liu | G08G 1/167 |
| 2020/0223434 A1* | 7/2020 | Campos Macias | G06V 10/141 |
| 2020/0249684 A1* | 8/2020 | Onofrio | G05D 1/0223 |
| 2021/0020045 A1* | 1/2021 | Huang | G05D 1/021 |
| 2021/0166052 A1* | 6/2021 | Park | G06N 3/045 |
| 2021/0213973 A1* | 7/2021 | Carillo Peña | B60W 60/0011 |
| 2021/0387643 A1* | 12/2021 | Hari | B60W 30/095 |
| 2021/0389769 A1* | 12/2021 | Hari | G05D 1/0214 |
| 2022/0066456 A1* | 3/2022 | Ebrahimi Afrouzi | A47L 9/2873 |
| 2023/0126130 A1* | 4/2023 | Jeong | G01C 21/3867 701/533 |
| 2023/0127185 A1* | 4/2023 | Jeong | G01C 21/3807 701/25 |
| 2023/0202473 A1* | 6/2023 | Shalev-Shwartz | B60W 40/107 701/93 |
| 2023/0286530 A1* | 9/2023 | Angerer | G01C 21/3807 |
| 2023/0322208 A1* | 10/2023 | Rojas | B60W 10/20 701/41 |
| 2023/0326182 A1* | 10/2023 | Sivaraman | G06V 20/47 382/159 |

FOREIGN PATENT DOCUMENTS

| | | | | |
|---|---|---|---|---|
| CN | 205451529 U | 8/2016 | | |
| CN | 112466159 A | 3/2021 | | |
| EP | 4019288 A1 * | 6/2022 | ........... | B60C 11/246 |
| WO | WO-2023069398 A1 * | 4/2023 | ........... | B60W 60/001 |

OTHER PUBLICATIONS

Han Yongwang, Study The Method of Typical Blind Spot Accident Warning of the Truck, Master's Dissertation, 2014, pp. 1-71, Yanshan University.

Xie Xuemin, et al., Study on blind areas and solution of light truck exterior view mirror, Automobile Applied Technology, 2018, pp. 90-93, Issue 7.

Wang Nannan, Study on the Mechanism and Prevention of the Collision Between Right-Turning Semi-Trailer Train and Slow-Traffic Travelers, The Master of Engineering Degree of Communication and Transportation Engineering, 2020, pp. 1-85, Hebei University of Technology.

* cited by examiner

MAPPING METHOD FOR RIGHT-TURN CONFLICT WARNING LINES AT URBAN ROAD INTERSECTIONS

CROSS REFERENCE TO THE RELATED APPLICATIONS

This application is based upon and claims priority to Chinese Patent Application No. 202210748742.7, filed on Jun. 29, 2022, the entire contents of which are incorporated herein by reference.

TECHNICAL FIELD

The present invention relates to the field of traffic safety technology, in particular to a mapping method for right-turn conflict warning lines at urban road intersections.

BACKGROUND

In many traffic accidents, large vehicles (including city buses, municipal public vehicles, large buses, and large trucks) often collide with pedestrians or non-motorized vehicles when turning right, resulting in injuries or even deaths of pedestrians or non-motorized riders. When a large vehicle is turning right, the rear wheels often do not follow the trajectory of the front wheels, so the trajectory of the front and rear wheels on the right side is often not a curve but a wrapped crescent. This area surrounded by the trajectory of the front and rear wheels of large vehicles is generally called the right-turn blind area. In recent years, the frequency of traffic accidents caused by the right-turn blind area of large vehicles is very high, and the probability of death is relatively high. Therefore, the right-turn of large vehicles has attracted much attention in safety research.

In order to improve this situation, many cities are carrying out the management of the turning right dangerous areas of large vehicles. The governance practices are generally divided into three types: 1. Carry out the driving norms of 'container trucks must stop before turning right' and 'start again after right-turn parking'. 2. The 'blind spot sentinel' alarm system is installed on the trucks. 3. In view of the blind area when the large trucks right-turn at the intersection, the 'warning belt of the blind area of the large trucks' is introduced to solve the problem of frequent traffic accidents. The first two improvement measures often require human factors for supervision, and unilaterally from the perspective of motor vehicle drivers, other road participants at the intersection cannot intuitively observe the right-turn dangerous area of large vehicles, and the warning effect is not perfect. The 'warning belt of the blind area of large trucks' introduced later solves the above problems to a certain extent, the advantage of the warning belt of the dangerous blind area of large vehicles is that it can remind drivers and pedestrians, but generally when drawing the blind area warning belt, it is only set by the turning radius parameter of the intersection design, it is often not drawn according to the intersection characteristics of the local city, and it can not reflect the real right-turn dangerous area of the large vehicle more excellently. Therefore, there are some deficiencies in the existing ways to control the right-turn dangerous accidents of large vehicles.

At present, the research on the turning danger area of large vehicles starts late, first of all, there are few studies on the types of methods to reduce the risk of the right-turn of large vehicles, Some researchers are redesigning the intersection to change or re-plan the road, another large part of the researchers are more inclined to intervene and upgrade drivers and vehicles. For example, Huang Xiangyue et al. proposed comprehensive improvement measures and schemes such as intersection channelization design, signal timing design, and entrance and exit control in the paper *Traffic Organization Design of Double Sections around the Big Wild Goose Pagoda Based on Simulation Evaluation* (Journal of Guangzhou Maritime University, 2019). Han Yongwang's paper *Research on Early Warning Methods for Typical Blind Area Accidents of Trucks* (Master's Thesis of Yanshan University, 2014) analyzes the causes of accidents from the aspects of steering blind area, vehicle inner wheel difference, and driver's vision. Based on the research of pedestrian detection algorithms and the monocular ranging method, an effective early warning method is selected to realize the early warning function of blind area accidents. Most of the current studies analyze the phenomenon of right-turn danger of large vehicles from the driver's point of view or model a single right-turn to analyze the dangerous area of right-turn vehicles. However, few of them collect a large number of intersection data for analysis under actual conditions, so the representativeness is not strong, which fails to reflect the real situation of the right-turn dangerous area of large vehicles in cities. For example, Xie Xuemin analyzed the blind area of the rearview mirror of the light truck in the paper *Research on the Blind Area and Solution of the Rearview Mirror of the Light Truck* (Automotive Practical Technology, 2018), and proposed several solutions. Based on the formation mechanism of the visual blind area of the right rearview mirror, Wang Nannan proposed a right-turn visual blind compensation measure combining traditional rearview mirror and camera device in the paper *Research on the Collision Mechanism and Prevention of Right-turn and Slow Traffic of Semi-trailer Trains* (Master's thesis of Hebei University of Technology, 2020). And in the relevant patents (CN202011377405.9, CN201620013718.9, CN201020191614.X), the right-turn dangerous behaviors of large vehicles are prevented and controlled from the perspective of lighting warning.

Based on the above reasons, the present invention needs to provide a reasonable method for mapping right-turn conflict warning lines at urban road intersections to solve the problem that the existing technology is more inclined to intervene and upgrade the driver and the vehicle. Most of them analyze the phenomenon of the right-turn danger of large vehicles from the perspective of the driver or model a single right-turn to analyze the right-turn conflict area of the right-turn vehicle, so that other road participants at the intersection cannot intuitively observe the right-turn dangerous area of the large vehicle, and the warning effect is not perfect enough. And when drawing the blind spot warning belt of each intersection, it is necessary to collect and investigate the data of the large vehicle trajectory at the intersection.

SUMMARY

In order to make up for the shortcomings of the existing technical problems, the present invention provides a mapping method for right-turn conflict warning lines at urban road intersections, the present invention uses the rear wheel trajectory cluster of large vehicles to determine the right-turn conflict area. By drawing a right-turn warning line on the right-turn conflict area, it can warn various traffic participants, such as pedestrians and non-motor vehicles, and solve the problem that the existing technology is more inclined to intervene and upgrade drivers and vehicles. In addition, by discussing the relationship between the right-turn conflict area and the dynamic and static indexes of the intersection, the relationship between the influence parameters of the right-turn conflict area and the dynamic and static indexes is obtained. Therefore, when measuring the right-turn warning lines at other intersections, only the dynamic and static indexes of the intersection need to be input to obtain the right-turn conflict area of the corresponding intersection, so as to solve the problem that the existing technology needs to collect and investigate the data of the large vehicle trajectory of each intersection in the process of measuring the right-turn warning lines.

The technical solution of the present invention is as follows:

A mapping method for right-turn conflict warning lines at urban road intersections, including the following steps:

(1) designing experiments, selecting a road intersection with a certain amount of large vehicles as a research site, and obtaining video data of a road intersection through a drone traffic flow video detection device;

(2) extracting the video data of the road intersection obtained in step (1), obtaining rear wheel trajectory data of the right-turn of large vehicles at the intersection, and obtaining a rear wheel trajectory data group;

(3) according to the rear wheel trajectory data group of the right-turn of large vehicles obtained in step (2), fitting an outermost rear wheel trajectory curve and an innermost rear wheel trajectory curve;

(4) determining the relative position of the outermost rear wheel trajectory curve, the innermost rear wheel trajectory curve, and a zebra crossing on the premise that the right-turn conflict area does not exceed the edge of the zebra crossing, and determining the right-turn conflict area of large vehicles: the area between the inner rear wheel trajectory curve, the outer rear wheel trajectory curve and the zebra crossing;

(5) obtaining dynamic index data and static index data of urban road intersections in the exploration site;

the dynamic index includes an average body length of the right-turn of large vehicles at the intersection, an average speed of the right-turn of large vehicles at the intersection, and a traffic flow at the intersection;

the static index includes a one-way road width of the intersection road, an intersection angle of the intersection road, a zebra crossing width of the entrance of the intersection road, a design turning radius of the intersection road, a distance from a right-turn lane endpoint to an exit stop line of the intersection road, a distance from an entrance of the intersection road to the stop line intersection;

(6) constructing a dynamic model of the right-turn conflict area of large vehicles by using a regression model.

Specifically, establishing a multiple linear regression model by using 9 dynamic and static index data in step (5) as independent variables, and the influence parameters of the outermost rear wheel trajectory curve and the innermost rear wheel trajectory curve as dependent variables; analyzing the multiple linear regression model to obtain the relationship between the influence parameters of the outermost rear wheel trajectory curve and the innermost rear wheel trajectory curve and the dynamic index and static index, so as to obtain the dynamic model of the right-turn conflict area of large vehicles.

(7) obtaining the dynamic index data and static index data of the right-turn conflict warning line at road intersections, and inputting the dynamic index data and static index data into the dynamic model of the right-turn conflict area of the large vehicles in step (6), obtaining the outermost rear wheel trajectory curve and the innermost rear wheel trajectory curve of the road intersection, and drawing the right-turn conflict area warning line along the outermost rear wheel trajectory curve, the innermost rear wheel trajectory curve and the zebra crossing.

Aiming at the video data of the road intersection obtained in step (1), using the PR video software to analyze the captured videos and then obtain the traffic flow at the intersection in the current period, using a Tracker trajectory tracking software to track the large vehicles at the intersection to obtain the average speed of the right-turn of large vehicles at the intersection.

Obtaining the rear wheel trajectory data of the right-turn of large vehicles described in step (2) using the Tracker trajectory tracking software, as follows:

(3.1) selecting a corner of a rightmost lane as an origin of coordinates, selecting two feature points with a known distance, and the distance between the two feature points as a feature length;

(3.2) using the rear wheel area of the large vehicle which is turning right in the video as the feature area for identification and tracking, and then calculating the center of the wheel area as the wheel center, and using the wheel center coordinate tracking result of each frame as the motion trajectory of the vehicle wheel center;

(3.3) collecting a trajectory y=h(x) of the monitoring points within a certain number of frames, where X is a coordinate in the horizontal direction of the rear wheel trajectory of the large truck, where y is a coordinate in the vertical direction of the rear wheel trajectory of the large truck, and determining the coordinate(x,y) of each frame of the vehicle running on the curve is determined by comparing the characteristic length.

The fitting method of the outermost rear wheel trajectory curve and the innermost rear wheel trajectory curve is as follows:

using ORIGIN software to fit outer coordinate points of the rear wheel trajectory data group to obtain the outermost rear wheel trajectory curve $y=f(X_{outermost})$ :

$$y=A_{2_{outermost}}+(A_{2_{outermost}}-A_{2_{outermost}})\cdot[1+(X/X_{0_{outermost}})^{P_{outermost}}]$$

among them, $A_{1_{outermost}}$, $A_{2_{outermost}}$, $X_{0_{outermost}}$ and $P_{outermost}$ are the influence are the influence parameters of the outer rear wheel trajectory curve;

using SPSS software to fit the inner coordinate points of the rear wheel trajectory data group to obtain the innermost rear wheel trajectory curve $y=g(X_{innermost})$ :

$$y=A_{2_{innermost}}+(A_{2_{innermost}}-A_{2_{innermost}})\cdot[1+(X/X_{0_{innermost}})^{P_{innermost}}]$$

among them, $A_{1_{innermost}}$, $A_{2_{innermost}}$, $X_{0_{innermost}}$ and $P_{innermost}$ are the influence parameters of the inner rear wheel trajectory curve.

The multiple linear regression model is as follows:

$$A_{1_{outermost}} = a_{10} + a_{11}x_1 + a_{12}x_2 + a_{13}x_3 +$$
$$a_{14}x_4 + a_{15}x_5 + a_{16}x_6 + a_{17}x_7 + a_{18}x_8 + a_{19}x_9 + \varepsilon_1,$$
$$A_{2_{outermost}} = a_{20} + a_{21}x_1 + a_{22}x_2 + a_{23}x_3 +$$
$$a_{24}x_4 + a_{25}x_5 + a_{26}x_6 + a_{27}x_7 + a_{28}x_8 + a_{29}x_9 + \varepsilon_2,$$
$$X_{0_{outermost}} = a_{30} + a_{31}x_1 + a_{32}x_2 + a_{33}x_3 +$$
$$a_{34}x_4 + a_{35}x_5 + a_{36}x_6 + a_{37}x_7 + a_{38}x_8 + a_{39}x_9 + \varepsilon_3,$$

-continued $$p_{outermost} = a_{40} + a_{41}x_1 + a_{42}x_2 + a_{43}x_3 +$$
$$a_{44}x_4 + a_{45}x_5 + a_{46}x_6 + a_{47}x_7 + a_{48}x_8 + a_{49}x_9 + \varepsilon_4,$$
$$A1_{innermost} = a_{50} + a_{51}x_1 + a_{52}x_2 + a_{53}x_3 +$$
$$a_{54}x_4 + a_{55}x_5 + a_{56}x_6 + a_{57}x_7 + a_{58}x_8 + a_{59}x_9 + \varepsilon_5,$$
$$A2_{innermost} = a_{60} + a_{61}x_1 + a_{62}x_2 + a_{63}x_3 +$$
$$a_{64}x_4 + a_{65}x_5 + a_{66}x_6 + a_{67}x_7 + a_{68}x_8 + a_{69}x_9 + \varepsilon_6,$$
$$X0_{innermost} = a_{70} + a_{71}x_1 + a_{72}x_2 + a_{73}x_3 +$$
$$a_{74}x_4 + a_{75}x_5 + a_{76}x_6 + a_{77}x_7 + a_{78}x_8 + a_{79}x_9 + \varepsilon_7,$$
$$p_{innermost} = a_{80} + a_{81}x_1 + a_{82}x_2 + a_{83}x_3 +$$
$$a_{84}x_4 + a_{85}x_5 + a_{86}x_6 + a_{87}x_7 + a_{88}x_8 + a_{89}x_9 + \varepsilon_8,$$

among them, $x_1$ is an average body length of the right-turn of large vehicles at the intersection, $x_2$ is an average speed of the large vehicle turning right at the intersection, $x_3$ is an one-way road width of the intersection road, $x_4$ is a size of the intersection angle of intersection road, $x_5$ is a zebra crossing width of intersection, $x_6$ is a intersection traffic flow, $x_7$ is a design turning radius of the intersection road, $x_8$ is a distance from the right-turn lane endpoint to the exit stop line of the intersection road, $x_9$ is a distance from the entrance of the intersection road to the stop line intersection.

Analyzing the multiple linear regression model, Specifically, using the SPSS data analysis software for multiple linear regression analysis; in the regression analysis, selecting a backward method to screen the independent variables, and obtaining the relationship between the influence parameters of the outermost rear wheel trajectory curve and the innermost rear wheel trajectory curve and the dynamic index and static index.

The advantages of the present invention are:

The present invention is based on the rear wheel trajectory data group of the right-turn of the large vehicles and the precondition that the right-turn conflict area does not exceed the edge of the zebra crossing and determines the right-turn conflict area, which can truly reflect the real right-turn conflict area of large vehicles, thereby reducing the accident rate of non-motor vehicles and pedestrians at road intersections.

By discussing the relationship between the right-turn conflict area and the dynamic and static parameters of the intersection, obtaining the relationship between the influence parameters of the right-turn conflict area and the dynamic and static parameters. Therefore, when measuring the right-turn warning line at other intersections, it is only necessary to input the dynamic and static parameters of the intersection to obtain the right-turn conflict area of the corresponding intersection. It is not necessary to collect and investigate the data of the large vehicle trajectory at each intersection, which can effectively reduce the workload and improve work efficiency.

The right-turn conflict warning line measured by the present invention can dynamically change with the different parameters of the intersection. Compared with the existing right-turn conflict warning lines which are only set by the turning radius of the intersection, it is more scientific and reasonable, and can more accurately reflect the real right-turn conflict area of large vehicles, reminding large vehicles to pay attention to driving in this area when driving in the warning area. On the other hand, it can warn non-motor vehicles and pedestrians to pay attention to road conditions.

DETAILED DESCRIPTION OF THE EMBODIMENTS

In the following, the technical solution in the embodiment of the present invention will be described clearly and completely in combination with the attached diagrams in the embodiment of the present invention.

Figure 1:
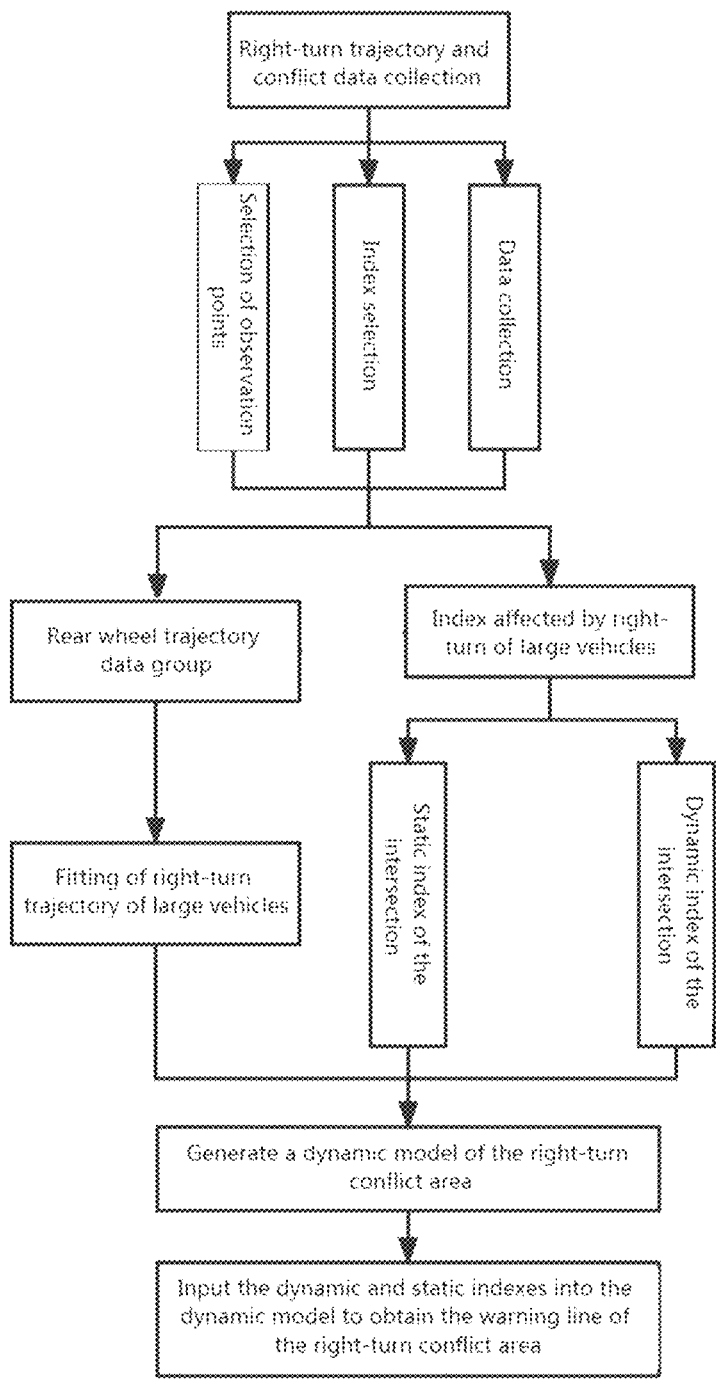
FIG. 1 is a flow chart of the present invention.

As shown in FIG. 1, this embodiment discloses a mapping method for right-turn conflict warning lines at urban road intersections, including the following steps:

(1) Design experiments, data such as the trajectory of the right-turn of large vehicles were collected at an urban road intersection, the traffic volume of the intersection, and the speed of large vehicles at the intersection through a drone;

in the experiment, a representative road intersection with a large vehicle traffic volume was selected as the research site. Before the experiment, the drone traffic flow video detection device was placed over the intersection, through the method of high-altitude data collection and detection by drone, the urban intersection conflict data and large vehicle trajectory information were obtained. The drone traffic flow video detection device was in wireless connection with a mobile phone, and the right-turn video of the large vehicle was stored in the memory card; among them, the flight height of the drone traffic flow video detection device was 150 meters. After collecting the data, the PR video software was used to analyze the captured video to obtain the traffic volume of the intersection in the current period, and then the Tracker trajectory tracking software was used to track the large vehicles at the intersection to obtain the average right-turn speed of the large vehicles at the intersection.

(2) According to the obtained video information, the rear wheel trajectory data of the right-turn of large vehicles at the intersection were extracted to obtain the rear wheel trajectory data group.

According to the data obtained in step (1), the Tracker trajectory tracking software was used to explore the change rule of the rear wheel trajectory of large vehicles over time. Firstly, the corner of the rightmost lane was selected as the origin of coordinates in the video, and then two feature points with a known distance were selected, the distance between the two feature points was called the feature length. Then, the rear wheel area of the turning right large vehicle in the video was selected as the feature area for identification and tracking, and then the center of the wheel area was calculated, which is approximately the wheel center. The tracking result of the wheel center coordinate of each frame can be regarded as the trajectory of the wheel center of the vehicle. By collecting the trajectory y=h(x) of the monitoring points in a certain number of frames, where x was the horizontal coordinate of the rear wheel trajectory of large vehicles, where y was the vertical coordinate of the rear wheel trajectory of large vehicles, and the coordinate(x, y) of each frame of the vehicle running on the curve were determined by comparing the characteristic length.

(3) According to the right-turn rear wheel trajectory data of large vehicles obtained in step (2), the right-turn rear wheel trajectory model of large vehicles was established.

The right-turn conflict area of large vehicles refers to the dangerous area formed on the right side of the vehicle that is difficult for the driver to observe due to the formation of the inner wheel difference during the right-turn of large vehicles, which further expands the visual danger area. According to the trajectory analysis, for a single urban road intersection, the right-turn trajectories of most large vehicles were concentrated in a specific area and the traffic accident-prone points were often close to the roadside, and the traffic conflict area often does not exceed the edge of the zebra crossing. Therefore, the relative position of the inner and outer rear wheel trajectory curves of the rear wheel trajectory data group and the zebra crossing was determined, and the right-turn conflict area of large vehicles was determined. The outer arc of the right-turn conflict area and the inner arc of the right-turn conflict area were indefinite curves. The formation of the curve was affected by many factors, such as intersection design parameters, vehicle physical operation parameters, etc. The arc represents the outermost curve $y=f(x_{0_{outermost}})$ and the innermost curve $y=g(x_{innermost})$ of the rear wheel trajectory data group at the road intersection, and the right-turn conflict area of large vehicles was the mapping of the right-turn trajectory cluster of large vehicles at the urban road intersection, that is, the right-turn rear wheel trajectory $y=h(x)$ satisfied the following relationship:

$$g(x_{innermost}) \leq f(x) \leq f(X_{outermost}) \quad (1)$$

$$X \leq l_1 \quad (2)$$

among them, $l_1$, was the distance from the right-turn lane endpoint to the exit stop line of the intersection road.

According to ORIGIN software, the logistic model was used to fit the outermost rear wheel trajectory curve $y=f(x_{outermost})$:

$$y = A_{2_{outermost}} + (A_{1_{outermost}} - A_{2_{outermost}}) \cdot [1 + (X/X_{0_{outermost}})^{P_{outermost}}] \quad (3)$$

the innermost rear wheel trajectory curve $y=g(x_{innermost})$ was fitted according to SPSS software:

$$y = A_{2_{innermost}} + (A_{1_{innermost}} - A_{2_{innermost}}) \cdot [1 + (x/x_{0_{innermost}})^{P_{innermost}}] \quad (4)$$

Therefore, the point set model S of the right-turn rear wheel trajectory area of large vehicles was:

$$S = \{(X,Y) | g(x_{innermost}) \leq y \leq f(x_{outermost}), x \leq l_1, y \geq 0\} \quad (5)$$

According to the survey, it was found that the influence parameters ($A_{1_{outermost}}$, $A_{2_{outermost}}$, $X_{0_{outermost}}$ and $P_{outermost}$) of the outermost rear wheel trajectory curve $y=f(X_{outermost})$ in the right-turn conflict area, and the influence parameters ($A_{1_{innermost}}$, $A_{2_{innermost}}$, $X_{0_{innermost}}$ and $P_{innermost}$) of the innermost rear wheel trajectory curve $y=g(x_{innermost})$ were different at different road intersections. Therefore, in order to measure the right-turn conflict area of large vehicles with urban characteristics, it is necessary to find the representative dynamic and static indicators of urban road intersections that affect the eight influence parameters of the right-turn conflict area.

Figure 2:
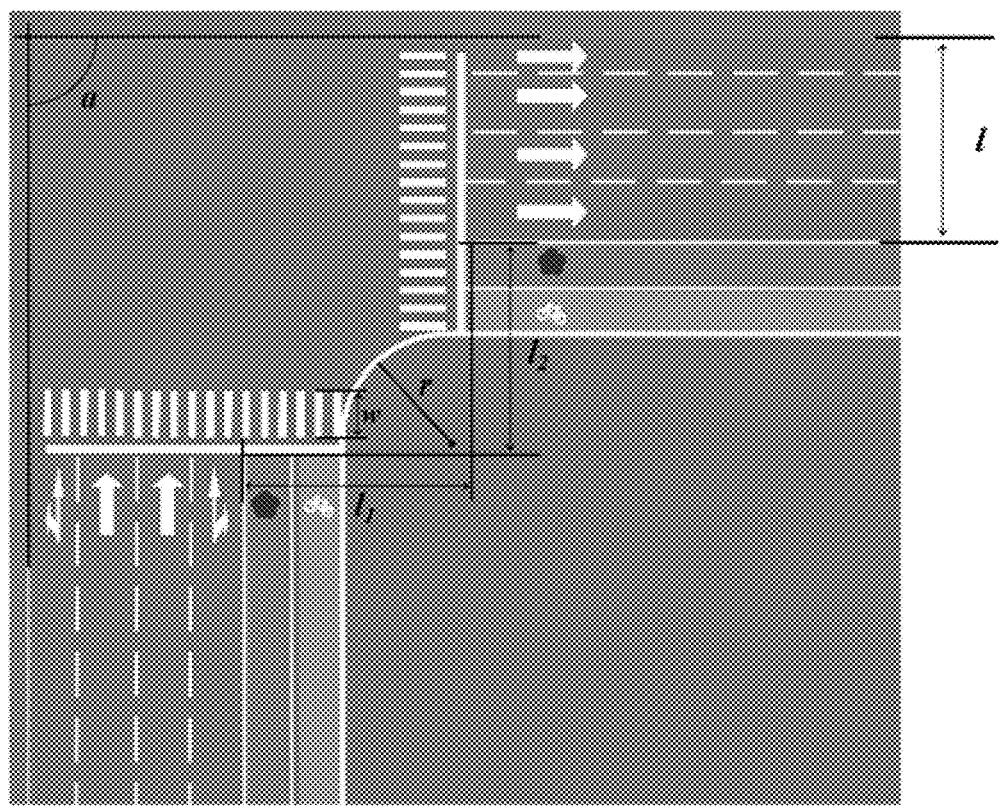
FIG. 2 is a schematic diagram of the static index of the intersection of the present invention.

(4) By analyzing the dangerous accident data of the right-turn of large vehicles in previous years and consulting relevant research, the indicators affecting the right-turn of large vehicles were mainly divided into two categories: static indicators (as shown in FIG. 2) and dynamic indicators at the intersection, and the indicators affecting the right-turn of large vehicles at the intersection were collected by field measurement and the drone traffic flow video detection device.

Dynamic index of urban road intersection:
① The average body length(s) of the right-turn of large vehicles at the intersection;
② The average speed(v) of the right-turn of large vehicles at the intersection;
③ Traffic flow at the intersection (veh/h);
The static index of the urban road intersection:
④ One-way road width of the intersection road (l);
⑤ The intersection angle of the intersection road (a);
⑥ The zebra crossing width of the entrance of the intersection road(w);
⑦ The design turning radius of the intersection road (r);
⑧ The distance from the right-turn lane endpoint to the exit stop line of the intersection road ($l_1$);
⑨ The distance from the entrance of the intersection road to the stop line intersection ($l_2$);

(5) According to the dynamic and static indexes in step (4), the regression model was used to analyze the relationship between the dynamic and static indexes of different intersections and the right-turn conflict area of large vehicles and the dynamic model of the right-turn conflict area was established.

The purpose of using multiple linear regression equations to establish the model was to determine the eight influencing parameters ($A_{1_{outermost}}$, $A_{2_{outermost}}$, $X_{0_{outermost}}$, $P_{outermost}$, $A_{1_{innermost}}$, $A_{2_{innermost}}$, $X_{0_{innermost}}$ and $P_{innermost}$) of the right-turn conflict area at different intersections. According to the investigation of the static and dynamic indexes of intersections with more large vehicles in the city, the average body length of the right-turn of large vehicles at the intersection x1, the average speed of the large vehicle turning right at the intersection x2, the one-way road width of the intersection road X3, the size of the intersection angle of intersection road X4, the zebra crossing width of intersection X5, the intersection traffic flow x6, the design turning radius of the intersection road x7, the distance from the right-turn lane endpoint to the exit stop line of the intersection road X8 and the distance from the entrance of the intersection road to the stop line intersection X9 were selected; these 9 dynamic and static parameters were used as independent variables, and the influence parameters of the right-turn conflict area were the dependent variables. The multiple linear regression model can be established as follows:

$$A_{1_{outermost}} = a_{10} + a_{11}x_1 + a_{12}x_2 + a_{13}x_3 +$$
$$a_{14}x_4 + a_{15}x_5 + a_{16}x_6 + a_{17}x_7 + a_{18}x_8 + a_{19}x_9 + \varepsilon_1,$$

$$A_{2_{outermost}} = a_{20} + a_{21}x_1 + a_{22}x_2 + a_{23}x_3 +$$
$$a_{24}x_4 + a_{25}x_5 + a_{26}x_6 + a_{27}x_7 + a_{28}x_8 + a_{29}x_9 + \varepsilon_2,$$

$$X_{0_{outermost}} = a_{30} + a_{31}x_1 + a_{32}x_2 + a_{33}x_3 +$$
$$a_{34}x_4 + a_{35}x_5 + a_{36}x_6 + a_{37}x_7 + a_{38}x_8 + a_{39}x_9 + \varepsilon_3,$$

$$p_{outermost} = a_{40} + a_{41}x_1 + a_{42}x_2 + a_{43}x_3 +$$
$$a_{44}x_4 + a_{45}x_5 + a_{46}x_6 + a_{47}x_7 + a_{48}x_8 + a_{49}x_9 + \varepsilon_4,$$

$$A_{1_{innermost}} = a_{50} + a_{51}x_1 + a_{52}x_2 + a_{53}x_3 +$$
$$a_{54}x_4 + a_{55}x_5 + a_{56}x_6 + a_{57}x_7 + a_{58}x_8 + a_{59}x_9 + \varepsilon_5,$$

$$A_{2_{innermost}} = a_{60} + a_{61}x_1 + a_{62}x_2 + a_{63}x_3 +$$
$$a_{64}x_4 + a_{65}x_5 + a_{66}x_6 + a_{67}x_7 + a_{68}x_8 + a_{69}x_9 + \varepsilon_6,$$

$$X_{0_{innermost}} = a_{70} + a_{71}x_1 + a_{72}x_2 + a_{73}x_3 +$$
$$a_{74}x_4 + a_{75}x_5 + a_{76}x_6 + a_{77}x_7 + a_{78}x_8 + a_{79}x_9 + \varepsilon_7,$$

$$p_{innermost} = a_{80} + a_{81}x_1 + a_{82}x_2 + a_{83}x_3 +$$
$$a_{84}x_4 + a_{85}x_5 + a_{86}x_6 + a_{87}x_7 + a_{88}x_8 + a_{89}x_9 + \varepsilon_8,$$

SPSS data analysis software was used for multiple linear regression analysis, in the regression analysis, the backward method was selected to screen the independent variables, finally, the relationship between the influence parameters ($A_{1_{outermost}}$, $A_{2_{outermost}}$, $X_{0_{outermost}}$, $P_{outermost}$, $A_{1_{innermost}}$, $A_{2_{innermost}}$, $X_{0_{innermost}}$ and $P_{innermost}$) and the dynamic and static indexes with urban characteristics of the right-turn conflict area of large vehicles were obtained.

(6) According to the relationship model between the dynamic and static parameters of different intersections and the right-turn conflict area of large vehicles obtained in step (5), it was no longer necessary to collect and investigate the data of the large vehicle trajectory of the intersection when the right-turn warning line of the intersection was measured and drawn at other intersections.

Although the embodiments of the present invention have been shown and described, it is understandable for ordinary technicians in the field that these embodiments can be varied, modified, replaced, and modified without departing from the principle and spirit of the present invention, and the protection scope of the present invention is limited by the accompanying claims and their equivalents.

What is claimed is:

1. A mapping method for right-turn conflict warning lines at urban road intersections, wherein one or more processors are configured to implement the following steps:

(1) receiving, by the one or more processors, video data of a road intersection through a drone traffic flow video detection device, wherein the road intersection comprises large vehicles traffic;

(2) extracting, by the one or more processors, from the video data of the road intersection obtained in step (1), to obtain:

rear wheel trajectory data of a right-turn of the large vehicles at the road intersection, and obtaining a rear wheel trajectory data group, wherein obtaining, by the one or more processors, the rear wheel trajectory data of the right-turn of the large vehicles described in step (2), comprises the steps of:

(2.1) selecting, by the one or more processors:
a corner of a rightmost lane as an origin of coordinates;
two feature points with a known distance; and
the distance between the two feature points as a feature length;

(2.2) using, by the one or more processors, a rear wheel area of the large vehicle which is turning right in the video as a feature area for identification and tracking, and then calculating, by the one or more processors, a center of the wheel area as a wheel center, and using, by the one or more processors, a wheel center coordinate tracking result of each frame as a motion trajectory of the vehicle wheel center; and (2.3) collecting, by the one or more processors, a trajectory y=h(x) of monitoring points within a plurality of frames, wherein x is a coordinate in a horizontal direction of a rear wheel trajectory of the large vehicle, wherein y is a coordinate in a vertical direction of the rear wheel trajectory of the large vehicle, and determining, by the one or more processors, the coordinate (x, y) of each frame of the vehicle running on a curve of the road intersection by comparing a characteristic length;

(3) fitting, by the one or more processors, an outermost rear wheel trajectory curve and an innermost rear wheel trajectory curve, according to the rear wheel trajectory data group of the right-turn of the large vehicles obtained in step (2);

a fitting method of the outermost rear wheel trajectory curve and the innermost rear wheel trajectory curve, implemented by the one or more processors, is as follows:

fitting, by the one or more processors, outer coordinate points of the rear wheel trajectory data group to obtain the outermost rear wheel trajectory curve $y=f(x_{outermost})$:

$$y = A_{2_{outermost}} + (A_{1_{outermost}} - A_{2_{outermost}}) \cdot [1 + (x/x_{0_{outermost}})^{P_{outermost}}]$$

among them, $A_{1_{outermost}}$, $A_{2_{outermost}}$, $X_{0_{outermost}}$ and $P_{outermost}$ are influence parameters of the outer rear wheel trajectory curve;

(4) determining, by the one or more processors, a relative position of the outermost rear wheel trajectory curve, the innermost rear wheel trajectory curve, and a zebra crossing on a premise that a right-turn conflict area does not exceed an edge of the zebra crossing, and determining, by the one or more processors, the right-turn conflict area of the large vehicles: the area between the inner rear wheel trajectory curve, the outer rear wheel trajectory curve and the zebra crossing;

(5) obtaining, by the one or more processors, dynamic index data and static index data of the road intersection;

the dynamic index comprises an average body length of the of large vehicles taking the right turn at the road intersection, an average speed of the large vehicles taking the right turn at the road intersection, and a traffic flow at the road intersection;

the static index comprises a one-way road width of the road intersection, an intersection angle of the road intersection, width of the zebra crossing of an entrance of the road intersection, a design turning radius of the road intersection, a distance from a right-turn lane endpoint to an exit stop line of the road intersection, a distance from the entrance of the road intersection to a stop line intersection;

(6) constructing, by the one or more processors, a dynamic model of the right-turn conflict area of the large vehicles by using a regression model;

specifically, establishing, by the one or more processors, a multiple linear regression model by using the dynamic and the static index data in step (5) as independent variables, and influence parameters of the outermost rear wheel trajectory curve and the innermost rear wheel trajectory curve as dependent variables; analyzing, by the one or more processors, the multiple linear regression model to obtain a relationship between the influence parameters of the outermost rear wheel trajectory curve and the innermost rear wheel trajectory curve and the dynamic index and the static index, so as to obtain the dynamic model of the right-turn conflict area of the large vehicles;

the multiple linear regression model, implemented by the one or more processors, is as follows:

$$A_{1_{outermost}} = a_{10} + a_{11}x_1 + a_{12}x_2 + a_{13}x_3 +$$
$$a_{14}x_4 + a_{15}x_5 + a_{16}x_6 + a_{17}x_7 + a_{18}x_8 + a_{19}x_9 + \varepsilon_1,$$
$$A_{2_{outermost}} = a_{20} + a_{21}x_1 + a_{22}x_2 + a_{23}x_3 +$$
$$a_{24}x_4 + a_{25}x_5 + a_{26}x_6 + a_{27}x_7 + a_{28}x_8 + a_{29}x_9 + \varepsilon_2,$$
$$X_{0_{outermost}} = a_{30} + a_{31}x_1 + a_{32}x_2 + a_{33}x_3 +$$
$$a_{34}x_4 + a_{35}x_5 + a_{36}x_6 + a_{37}x_7 + a_{38}x_8 + a_{39}x_9 + \varepsilon_3,$$
$$p_{outermost} = a_{40} + a_{41}x_1 + a_{42}x_2 + a_{43}x_3 +$$
$$a_{44}x_4 + a_{45}x_5 + a_{46}x_6 + a_{47}x_7 + a_{48}x_8 + a_{49}x_9 + \varepsilon_4,$$
$$A_{1_{innermost}} = a_{50} + a_{51}x_1 + a_{52}x_2 + a_{53}x_3 +$$
$$a_{54}x_4 + a_{55}x_5 + a_{56}x_6 + a_{57}x_7 + a_{58}x_8 + a_{59}x_9 + \varepsilon_5,$$
$$A_{2_{innermost}} = a_{60} + a_{61}x_1 + a_{62}x_2 + a_{63}x_3 +$$
$$a_{64}x_4 + a_{65}x_5 + a_{66}x_6 + a_{67}x_7 + a_{68}x_8 + a_{69}x_9 + \varepsilon_6,$$
$$X_{0_{innermost}} = a_{70} + a_{71}x_1 + a_{72}x_2 + a_{73}x_3 +$$
$$a_{74}x_4 + a_{75}x_5 + a_{76}x_6 + a_{77}x_7 + a_{78}x_8 + a_{79}x_9 + \varepsilon_7,$$
$$p_{innermost} = a_{80} + a_{81}x_1 + a_{82}x_2 + a_{83}x_3 +$$
$$a_{84}x_4 + a_{85}x_5 + a_{86}x_6 + a_{87}x_7 + a_{88}x_8 + a_{89}x_9 + \varepsilon_8,$$

wherein $x_1$ is the average body length of the large vehicles taking the right turn at the road intersection, $x_2$ is the average speed of the large vehicles turning right at the road intersection, $x_3$ is the one-way road width of the road intersection, $x_4$ is a size of the intersection angle of the road intersection, $x_5$ is the width of the zebra crossing of the road intersection, $x_6$ is the traffic flow at the road intersection, $x_7$ is the design turning radius of the road intersection, $x_8$ is the distance from the right-turn lane endpoint to the exit stop line of the road intersection, $x_9$ is the distance from the entrance of the road intersection to the stop line intersection;

(7) obtaining, by the one or more processors, the dynamic index data and the static index data of the right-turn conflict warning line at the road intersections, and inputting, by the one or more processors, the dynamic index data and the static index data into the dynamic model of the right-turn conflict area of the large vehicles in step (6), obtaining, by the one or more processors, the outermost rear wheel trajectory curve and the innermost rear wheel trajectory curve of the road intersection, and drawing, by the one or more processors, the right-turn conflict area warning line along the outermost rear wheel trajectory curve, the innermost rear wheel trajectory curve and the zebra crossing.

2. The mapping method for the right-turn conflict warning lines at the urban road intersections according to claim 1, wherein the video data of the road intersection obtained in step (1) is analyzed, by the one or more processors, to obtain the traffic flow at the road intersection in a current period and track the large vehicles at the road intersection to obtain the average speed of the right-turn of the large vehicles at the road intersection.

3. The mapping method for the right-turn conflict warning lines at the urban road intersections according to claim 1, wherein analyzing, by the one or more processors, the multiple linear regression model, specifically, for multiple linear regression analysis, comprises selecting, by the one or more processors, a backward method to screen the independent variables in the regression analysis, and obtaining, by the one or more processors, the relationship between the influence parameters of the outermost rear wheel trajectory curve and the innermost rear wheel trajectory curve and the dynamic index and the static index.

* * * * *